(12) United States Patent
Huang et al.

(10) Patent No.: US 10,118,801 B2
(45) Date of Patent: Nov. 6, 2018

(54) DIRECT DRIVE SYSTEM FOR PASSENGER CONVEYER DEVICE AND PASSENGER CONVEYER DEVICE

(71) Applicant: Otis Elevator Company, Farmington, CT (US)

(72) Inventors: Jiangxing Huang, Shanghai (CN); Fengshu Yue, Tianjin (CN); Shimao Chen, Hangzhou (CN); Jie Hu, Hangzhou (CN); Jianguo Li, Hangzhou (CN); Hongmin Zhu, Shanghai (CN); Jianye Yang, Shanghai (CN); Jiawei Wu, Shanghai (CN); Bingyin Cheng, Shanghai (CN); Jinqi Yang, Shanghai (CN); Yunyun Zhao, Shanghai (CN)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 15/800,827

(22) Filed: Nov. 1, 2017

(65) Prior Publication Data
US 2018/0118520 A1    May 3, 2018

(30) Foreign Application Priority Data
Nov. 3, 2016    (CN) .......................... 2016 2 1176306

(51) Int. Cl.
*B66B 23/02*    (2006.01)
*B65G 23/24*    (2006.01)

(52) U.S. Cl.
CPC ............ *B66B 23/026* (2013.01); *B65G 23/24* (2013.01); *B66B 23/02* (2013.01)

(58) Field of Classification Search
CPC ........ B66B 23/02; B66B 23/026; B65G 23/24
(Continued)

(56) References Cited

U.S. PATENT DOCUMENTS 1,023,443 A * 4/1912 Seeberger ............... B66B 29/08
                                                    198/324
2,056,541 A * 10/1936 Shonnard ................ B66B 23/02
                                                    198/323
(Continued)

FOREIGN PATENT DOCUMENTS

CN        101880002 U    6/2013
CN        104555684 A    4/2015
(Continued)

OTHER PUBLICATIONS

Electrical Knowhow, "Escalators Basic Components—Part Two", available at: http://www.electrical-knowhow.com/2012/04/escalators-basic-components-part-two.html, accessed Oct. 31, 2017, 16 pages.
(Continued)

*Primary Examiner* — Gene O Crawford
*Assistant Examiner* — Keith R Campbell
(74) *Attorney, Agent, or Firm* — Cantor Colburn LLP

(57) ABSTRACT

A direct-drive system for a passenger transportation apparatus, and a passenger transportation apparatus having same. The direct-drive system comprises: a motor comprising a motor output shaft, for providing power; a main drive shaft for transmitting the power to a passenger transportation portion of the passenger transportation apparatus; and a gear box comprising an input end connected to the motor output shaft and an output end connected to the main drive shaft respectively, and being used for transmitting the power, provided by the motor, to the main drive shaft, wherein the gear box comprises a plurality of gear pairs, and each of the gear pairs has a progressively decreasing gear slope along the direction from the input end of the gear box to the output end thereof.

22 Claims, 4 Drawing Sheets

(58) Field of Classification Search
USPC ........................................................ 198/330
See application file for complete search history.

(56) References Cited

U.S. PATENT DOCUMENTS

| | | | |
|---|---|---|---|
| 3,677,388 A | 7/1972 | Boltrek et al. | |
| 4,227,605 A * | 10/1980 | Hofling | B66B 23/026 |
| | | | 198/331 |
| 4,775,044 A | 10/1988 | Hofling | |
| 5,224,580 A | 7/1993 | Nurnberg et al. | |
| 6,155,401 A | 12/2000 | Lunardi et al. | |
| 6,640,959 B1 | 11/2003 | Haumann et al. | |
| 6,685,004 B2 | 2/2004 | Fargo et al. | |
| 6,966,420 B2 * | 11/2005 | Ackmann | B66B 23/02 |
| | | | 198/330 |
| 7,296,671 B2 | 11/2007 | Pietz | |
| 7,597,182 B2 | 10/2009 | Illedits et al. | |
| 7,784,598 B2 * | 8/2010 | Fang | B66B 23/026 |
| | | | 198/330 |
| 8,381,894 B2 | 2/2013 | Nurnberg et al. | |
| 2016/0167929 A1 | 6/2016 | Dai et al. | |

FOREIGN PATENT DOCUMENTS

| | | |
|---|---|---|
| CN | 204624937 U | 9/2015 |
| JP | H01288651 A | 11/1989 |
| JP | 2002048211 A | 2/2002 |

OTHER PUBLICATIONS

Renold Power Transmissions Ltd., "Transit Escalator Drives. Global Solutions" available at: http://www.renold.com/media/451453/TRANSIT-ESCALATOR-DRIVES.pdf, accessed Oct. 31, 2017, 6 pages.
European Search Report for Application No. 17200016.8-1017/3318529; dated Apr. 11, 2018; 7 pgs.

* cited by examiner

DIRECT DRIVE SYSTEM FOR PASSENGER CONVEYER DEVICE AND PASSENGER CONVEYER DEVICE

FOREIGN PRIORITY

This application claims priority to Chinese Patent Application No. 201621176306.3, filed Nov. 3, 2016, and all the benefits accruing therefrom under 35 U.S.C. § 119, the contents of which in its entirety are herein incorporated by reference.

TECHNICAL FIELD

The present utility model relates to the field of passenger transportation apparatuses, more particularly to a direct-drive system for a passenger transportation apparatus.

BACKGROUND

As a tool for improving a passenger's walking between stairs or shortening a passenger's walking distance, the passenger transportation apparatus is very common in daily life. As an example, escalators usually used between stairs of commercial buildings and moving sidewalks usually used in large-scale airports are especially common.

For such devices, besides the considerations from the perspective of performance, the convenience of installation of the devices should also be emphatically considered in the structural design thereof. For example, for the passenger transportation apparatus, the components, such as the motor and the gear box, of the drive system thereof can generally be fixed onto the truss; furthermore, installation between the main drive shaft and the stair of the escalator and between the main drive shaft and the hand strap should also be completed. In this process, restricted by practical installation environments, the positions of several components therein need to be adjusted. If the above-mentioned arrangement is continued, in adjustment, if the motor needs to be moved, the truss should be moved as a whole; and if the main drive shaft needs to be moved, the components, such as the stair or the hand strap, should also be adjusted synchronously. As a result, the installation of the passenger transportation apparatus wastes time and energy very much.

Moreover, the stability and reliability of the passenger transportation apparatus are also very important. In order to keep the steadiness of transportation, requirements for the drive system of the passenger transportation apparatus are more restricted. A turbine mechanism and a chain drive are mainly used in the drive system for a conventional passenger transportation apparatus. In such an arrangement, oil should be frequently added for lubrication, which on one hand may lead to the problem of lubricating oil leakage, and on the other hand needs to stop the operation of the equipment frequently, having the problem of consuming manpower for warranty and maintenance. The other kind of drive system for a passenger transportation apparatus utilizing gear drive can well overcome the above-mentioned problem, nevertheless, the drive mechanism in which multiple sets of gears are used for transmission may have larger radial vibration, which may lead to the drive system being unstable, thereby affecting the torque output.

SUMMARY OF THE INVENTION

An object of the present utility model consists in providing a highly reliable direct-drive system for a passenger transportation apparatus.

An object of the present utility model also consists in providing a highly reliable passenger transportation apparatus.

In order to achieve the object of the present utility model, according to one aspect of the present utility model, a direct-drive system for a passenger transportation apparatus is provided, which comprises: a motor comprising a motor output shaft, for providing power; a main drive shaft for transmitting the power to a passenger transportation portion of the passenger transportation apparatus; and a gear box comprising an input end connected to the motor output shaft and an output end connected to the main drive shaft respectively, and being used for transmitting to the main drive shaft the power provided by the motor, wherein the gear box comprises a plurality of gear pairs, and each of the gear pairs has a gradually decreasing gear slope along the direction from the input end of the gear box to the output end thereof.

According to a further aspect of the present utility model, a passenger transportation apparatus is also provided, which comprises a direct-drive system as stated above, and a truss, wherein the first end and second end of the main drive shaft is connected to the truss in a rotatable manner.

DETAILED DESCRIPTION

Figure 1:
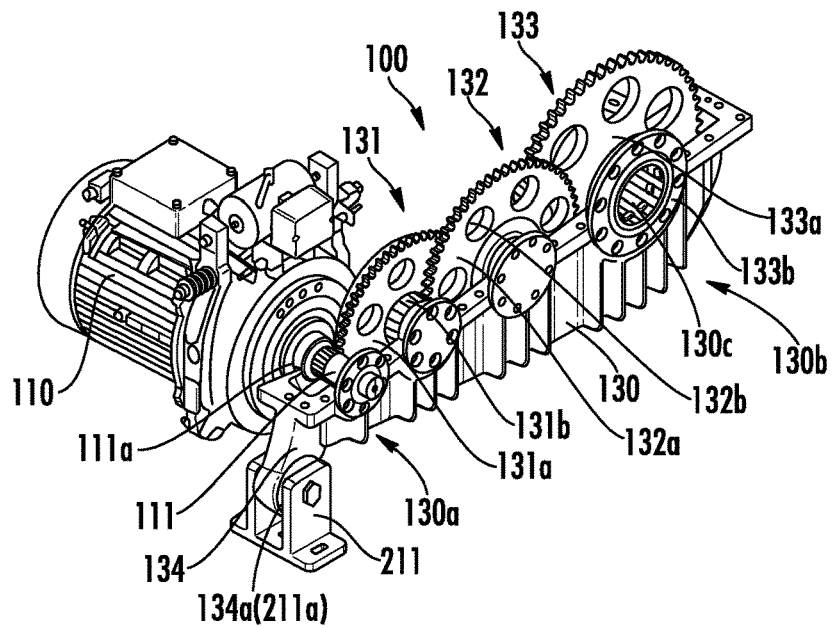
FIG. 1 is a first-perspective schematic diagram of a partial structure of one embodiment of a direct-drive system of the present utility model.
Figure 2:
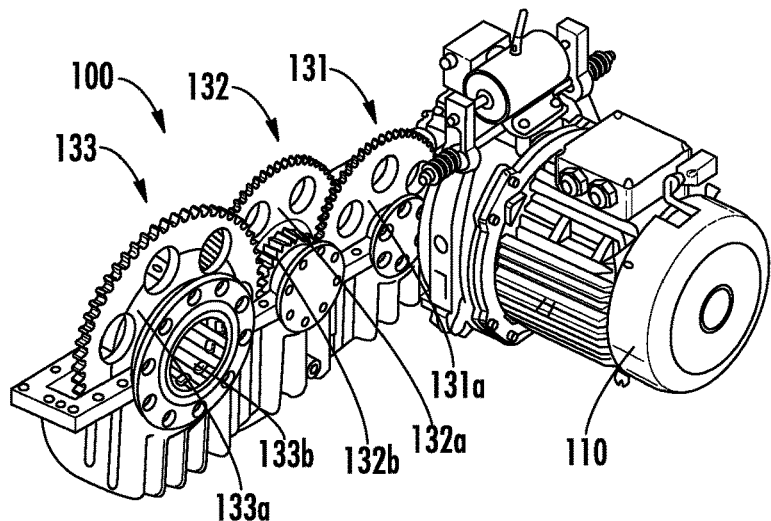
FIG. 2 is a second-perspective schematic diagram of a partial structure of one embodiment of the direct-drive system of the present utility model.
Figure 3:
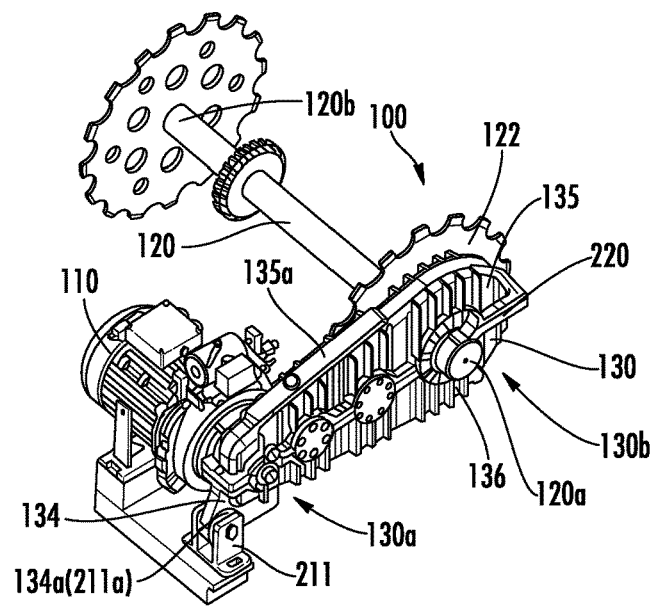
FIG. 3 is a schematic diagram of one embodiment of the direct-drive system of the present utility model.

Please refer to FIGS. 1 to 3, which show a direct-drive system 100 for a passenger transportation apparatus. As shown in the figures, the direct-drive system 100 comprises: a motor 110 for supplying power, a gear box 130 for transmitting the power and providing a speed shift and a main drive shaft 120 for transmitting the power to a passenger transportation portion (e.g., a stairstep of the passenger transportation apparatus) of the passenger transportation apparatus. The power is transmitted by the motor 110 through a motor output shaft 111 and is input through an input end 130a of the gear box 130, and is transmitted to the main drive shaft 120 through an output end 130b of the gear box 130 after a speed shift at the gear box 130, and is transmitted to the passenger transportation portion of the passenger transportation apparatus 200 through the main drive shaft 120. The gear box comprises a plurality of gear pairs, and each of the gear pairs has a gradually decreasing gear slope along the direction from the input end of the gear box to the output end thereof. It should be understood that a helical gear pair may generally bring about a larger axial force and cushion the impact, and a spur gear pair may provide a relatively stable output torque. Therefore, under the arrangement of this embodiment, since the gear pair close to the input end of the gear box have gear teeth with a large slope, there is a large axial force in the process of outputting power to the gear box 130 via the motor 110, thus there is a good meshing effect between the gear pair, finally reducing vibration, cushioning the impact and effectively reducing noise. In addition, a plurality of gear pairs in the middle have progressively decreasing gear slopes, which on one hand counteracts a part of the axial force and keeps a part of the noise reduction effect, and on the other hand provides transition for finally obtaining a gear pair connection at the output end of the gear box. The final gear pair at the output end of the gear box cooperates with gears having a relative minimum slope, which can effectively counteract the axial force and guarantee the stability and continuity of the power output to the main drive shaft. Since the slope of the gear varies progressively, while concerning different demands for the input end and output end of the gear box, the transition of the entire process is more gentle and stable, and the gear box as a whole thus has higher reliability.

Furthermore, in the preceding embodiment, it is only required that each gear pair has a progressively decreasing gear slope along the direct from the input end of the gear box to the output end thereof, not emphasizes that each gear pair needs to be helical gears. For example, in one example, when the gear slope of the gear pair closest to the output end decreases to a certain degree, it can also be a spur gear pair.

For realize the object of the preceding embodiment, the constitution of the gear pair in the direct-drive system is further elaborated. A first output gear mating with the input end of the gear box is arranged on the motor output shaft, and the gear box comprises, from the input end to the output end, at least one duplicate gear and a second output gear successively, wherein the number of teeth of the duplicate gear is greater than that of the first output gear, and the number of teeth of the duplicate gear is smaller than that of the second output gear, and/or the number of teeth of a driving duplicate gear is smaller than that of a driven duplicate gear. More particularly, the duplicate gear comprises a first gear and a second gear linked to each other, wherein the first gear is driven and the second gear is in linkage therewith, and the number of teeth of the first gear is greater than that of the second gear. In such an arrangement, the duplicate gear can effectively play the role of torque transmission as a connecting link, thus decelerating the output torque from a first output gear by at least two stages and transmitting same to a second output gear, satisfying the requirement of a high deceleration ratio for gear drive in the field of passenger transportation apparatus.

More particularly, when describing this solution by taking a gear box with three gear pairs as an embodiment, the gear box 130 comprises, in succession from the input end 130*a* to the output end 130*b*, a first duplicate gear 131, a second duplicate gear 132 and a second output gear 133, that is to say, a parallel-axis gear box 130 with three-class shift. The first duplicate gear 131 comprises a first helical gear 131*a* and a second helical gear 131*b*, wherein the first helical gear 131*a* meshes with a gear 111*a* on the motor output shaft 111, and the second helical gear 131*b* meshes with the second duplicate gear 132. Additionally, the second duplicate gear 132 comprises a third helical gear 132*a* and a fourth spur gear 132*b*, wherein the third helical gear 132*a* meshes with the second helical gear 131*b*, and the fourth spur gear 132*b* meshes with the second output gear 133. Moreover, the second output gear 133 comprises a fifth spur gear 133*a* and a power output portion 133*b*, wherein the fifth spur gear 133*a* meshes with the fourth spur gear 132*b*, and the power output portion 133*b* meshes with the main drive shaft 120. Thus, the power output via the motor 110 is transmitted to the main drive shaft 120 after three-class down shift, so as to realize steady transportation thereof.

Optionally, the first helical gear 131*a* constitutes a first gear pair with the gear 111*a* on the motor output shaft 111; the second helical gear 131*b* constitutes a second gear pair with the third helical gear 132*a*; and the fourth spur gear 132*b* constitutes a third gear pair with the fifth spur gear 133*a*, wherein the gear slope of the first gear pair is greater than the gear slope of the second gear pair. Under such an arrangement, since the first gear pair have gear teeth with a large slope, there is a large axial force in the process of outputting power to the gear box 130 via the motor 110, thus there is a good meshing effect between the gear pair, finally reducing vibration and effectively reducing noise. Furthermore, the second gear pair has a gear slope smaller than that of the first gear pair. This on one hand counteracts a part of the axial force and keeps a part of the noise reduction effect, and on the other hand provides transition for finally obtaining the connection of the third gear pair. The final third gear pair cooperates with spur gears, which can effectively counteract the axial force and guarantee the stability and continuity of the power output to the main drive shaft.

Furthermore, it should be appreciated that even though three gear pairs are used as an example in the preceding embodiment, in fact, the above-mentioned solution can also be applied to a solution with more or less gear pairs, for example, a gear box with four gear pairs. Of course, it should also be taken into consideration that while too many gear pairs are designed, the size of the practical arrangement space of the apparatus should also be concerned; and when two few gear pairs are designed, whether an expected high deceleration ratio can be reached should also be concerned.

Optionally, for each duplicate gear, the diameter of the first helical gear 131*a* is greater than that of the second helical gear 131*b*, and the diameter of the third helical gear is greater than that of the fourth helical gear 132*a*. In addition, optionally, for each gear pair, the diameter of the first helical gear 131*a* is greater than that of the gear 111*a* on the motor output shaft 111; the diameter of the third helical gear 132*a* is greater than that of the second helical gear 131*b*; and the diameter of the fifth spur gear 133*a* is greater than that of the fourth spur gear 132*b*. Such arrangements can all effectively improve the effect of speed shift in the gear box.

Optionally, as a particular implementation of a connection between the main drive shaft and the gear box, the main drive shaft 120 fits the output end 130*b* of the gear box 130 through a spline fit. Particularly, the spline fit can comprise an outer spline 121 and an inner spline 130*c* mating therewith. The outer spline 121 is arranged close to a first end 120*a* of the main drive shaft 120, and the inner spline 130*c* is arranged running through the gear box 130 along the axis of the second output gear 133. Such a connection manner can bring about a very reliable connection, thus guaranteeing the stability of the output.

In addition, optionally, the gear box 130 is at least partially borne by the main drive shaft 120, so that at least a part of load of the gear box 130 would be undertaken by the main drive shaft 120; in this way, the gear box does not need to be fixed onto the truss of the passenger transportation apparatus. Thus, when the relative position between various components needs to be adjusted in an installation site due to restriction of the external environment, the gear box and the main drive shaft can be directly moved as a whole, and the main drive shaft can be fixed relative to the truss when an appropriate installation position is reached, without the need for moving other components such as the truss together. In this way, the installation process of the entire passenger transportation apparatus is greatly simplified. Additionally, since this set of direct-drive system omits the drive chain part, the reliability of the connection between the gear box and the main drive shaft is effectively improved.

For the bearing arrangement in the preceding implementation, as an embodiment, more particularly, the output end 130b of the gear box 130 is borne by the main drive shaft 120, such that the load of the output end 130b of the gear box 130 is mainly undertaken by the main drive shaft 120. Furthermore, the gear box 130 further comprises a bearing support 134 arranged close to the input end 130a, and the gear box 130 is connected to a bearing seat 211 on the truss 210 of the passenger transportation apparatus 200 via a second bearing part; and the gear box 130 is partially borne by the truss 210. As such, the load of the gear box 130 close to the input end 130a is still undertaken by the truss 210. Such an arrangement enables that the gear box and the main drive shaft can be adjusted as a whole in the installation site, and the main drive shaft is fixed to the truss after the installation position relationship between them and the truss is confirmed, thus realizing the connection between both. Subsequently, the other end of the gear box is fixed to the truss again, further improving the fastness and reliability of the installation.

Optionally, an end of the bearing support 134 and the bearing seat 211 are respectively provided with a joint bearing 134a and a joint bearing saddle 211a mating with each other. Such an arrangement enables that the joint bearing provides some swing margin such that the gear box 130 has a certain vibration cushioning space when vibration or rotation of the gear box 130 occurs due to operation.

In addition, optionally, the gear box 130 comprises an upper box housing 135 and a lower box housing 136, thus facilitating the equipment maintenance and the replacement of parts. An overhaul window 135a can be provided on the upper box housing 135, thus being more convenient for the equipment maintenance.

Optionally, the motor 110 and a second end 120b of the main drive shaft 120 are deployed at the same side of the gear box 130, thus the internal installation space of the passenger transportation apparatus would be utilized more effectively.

Optionally, improvement has also been made to the gear box 130 of the direct-drive system, and the gear box 130 is a parallel-axis gear box 130; as such, a better speed shift effect would be provided.

Figure 4:
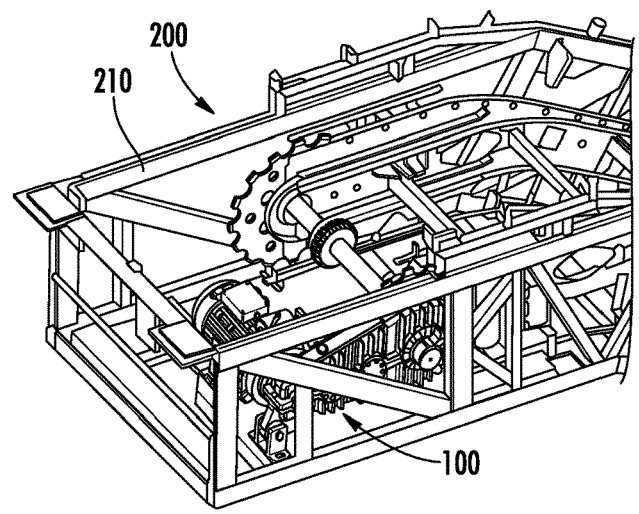
FIG. 4 is a first-perspective schematic diagram of a partial structure of one embodiment of a passenger transportation apparatus of the present utility model.
Figure 5:
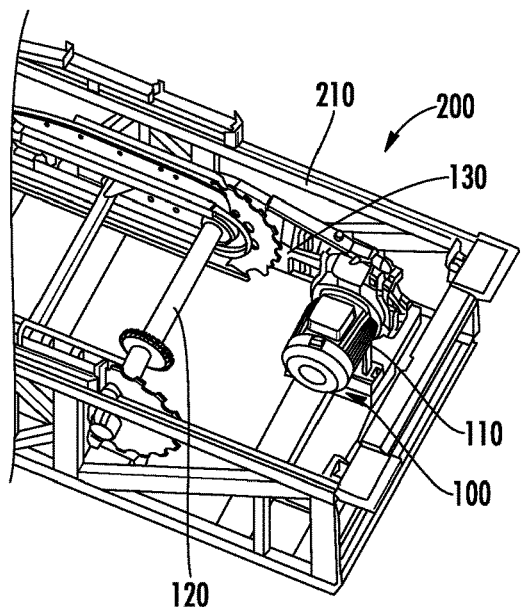
FIG. 5 is a second-perspective schematic diagram of a partial structure of one embodiment of the passenger transportation apparatus of the present utility model.
Figure 6:
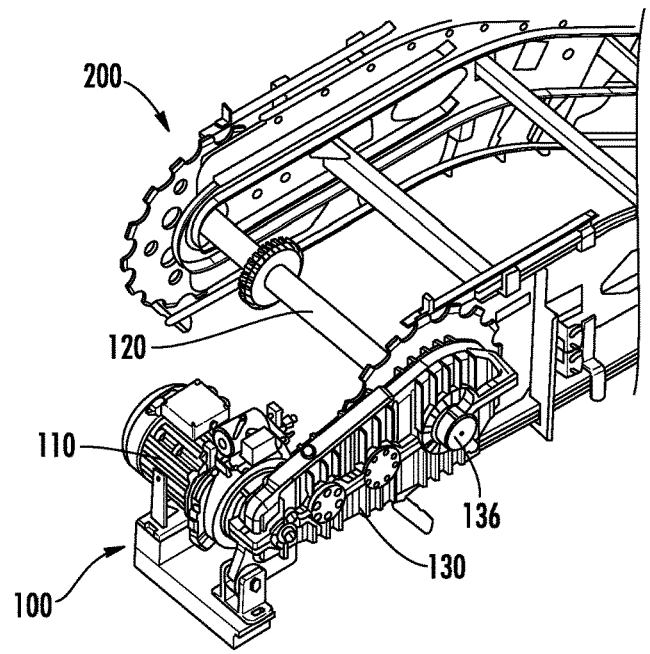
FIG. 6 is a third-perspective schematic diagram of a partial structure of one embodiment of the passenger transportation apparatus of the present utility model.
Figure 7:
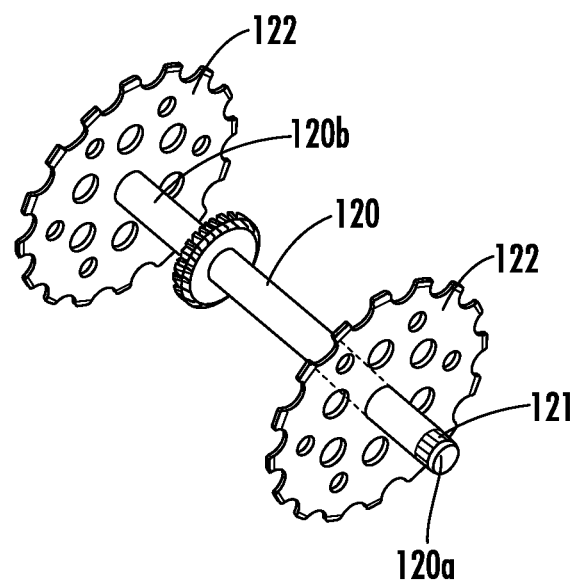
FIG.7 is a third-perspective schematic diagram of a partial structure of one embodiment of the passenger transportation apparatus of the present utility model.

Please refer to FIGS. 4 to 6, according to another aspect, an embodiment of a passenger transportation apparatus is also provided here. The passenger transportation apparatus 200 can comprise any embodiment of the preceding direct-drive system 100 or combination thereof; furthermore, the passenger transportation apparatus 200 further comprises a truss 210. The first end 120a and second end 120b of the main drive shaft 120 are connected to the truss 210 in a rotatable manner. In such an arrangement, on one hand, the load of the entire direct-drive system is still undertaken by the truss finally; and on the other hand, the adjustment of the position of the main drive shaft, the gear box and the motor relative to the truss is more convenient. Moreover, the main drive shaft can still rotate steadily and smoothly, so as to realize its basic function of driving the passenger transportation portion.

As a particular arrangement manner, the passenger transportation apparatus 200 comprises a bearing base 220, and the first end 120a and second end 120b of the main drive shaft 120 are fixed to the truss 210 via the bearing base 220. At this time, on one hand, the main drive shaft can be better fixed; one the other hand, it can still rotate relative to the bearing base, without influencing its rotation operation.

Optionally, the passenger transportation apparatus 200 further comprises a drive sprocket 122 provided on the main drive shaft 120, and the output end 130b of the gear box 130 is connected to the main drive shaft 120 at an outer side of the drive sprocket 122, thus utilizing the internal installation space of the passenger transportation apparatus more effectively.

Optionally, the first end 120a of the main drive shaft 120 is connected to the truss 210 by running through the gear box 130; as such, the internal installation space of the passenger transportation apparatus would also be utilized more effectively.

The installation process and operation process of the apparatus are described below in conjunction with the preceding embodiments of the direct-drive system and of the passenger transportation apparatus.

Upon adjusting the installation position relationship between the truss and the direct-drive system in the practical application site, the truss is deployed at first, and the relative installation position of the direct-drive system is subsequently determined on the truss. Hereafter, the output end of the gear box and the main drive shaft are successively fixed, and the gear box is partially borne by the main drive shaft; the main drive shaft is fixed to the truss pivotally; and the input end of the gear box is fixed to the truss, and the gear box is partially borne by the main drive shaft. In particular, firstly, the output end of the gear box can be fixed to the main drive shaft through a spline fit, so that transmission and fixation can be realized between both; moreover, the main drive shaft is fixed to the truss pivotally via the bearing base, so that the main drive shaft can play the primary load-bearing role, without the rotation and power transmission thereof being interfered by the truss, and the relative positioning of the direct-drive system and the truss can be realized in this step; finally, the bearing support, arranged on the gear box, away from one end of the main drive shaft is installed and fixed with the bearing seat on the truss, so as to realize the adjustment and installation of the complete set of apparatus.

During the operation of the passenger transportation apparatus, the motor outputs the power through the input of the gear box, and transmits the power to the main drive shaft through a spline fit after three-class down shift. The main drive shaft is driven and drives the drive sprocket, and finally drives the stairstep and hand strap of the passenger transportation apparatus, thus realizing the operation of both.

The above-mentioned examples mainly explain the direct-drive system for a passenger transportation apparatus, and a passenger transportation apparatus of the present utility model. Although only some of the embodiments of the present utility model are described, a person skilled in the art should understand that the present utility model can be implemented in many other forms without being away from the concept and range thereof. Therefore, the illustrated examples and implementations are considered illustrative but not restrictive, and the present utility model can cover various modifications and replacements without departing from the spirit and range of the present utility model defined by the appended claims.

What is claimed is:

1. A direct-drive system for a passenger transportation apparatus, characterized by comprising:
   a motor comprising a motor output shaft, for providing power;
   a main drive shaft for transmitting the power to a passenger transportation portion of the passenger transportation apparatus; and
   a gear box comprising an input end connected to the motor output shaft and an output end connected to the main drive shaft respectively, and being used for transmitting the power, provided by the motor, to the main drive shaft,
   wherein the gear box is a plurality of gear pairs, and each of the gear pairs has progressively decreasing gear slope along the direction from the input end of the gear box to the output end thereof, and wherein the gear box is parallel-axis gearbox, and the parallel-axis gear box comprises three or four gear pairs.

2. The direct-drive system according to claim 1, characterized in that a gear pair connected to the output end of the gear box is a spur gear pair.

3. The direct-drive system according to claim 1, characterized in that a first output gear mating with the input end of the gear box is arranged on the motor output shaft, and the gear box comprises, from the input end to the output end, at least one duplicate gear and a second output gear successively, wherein the number of teeth of the duplicate gear is greater than that of the first output gear, and the number of teeth of the duplicate gear is smaller than that of the second output gear, and/or when a plurality of duplicate gears are included, the number of teeth of a driving duplicate gear is smaller than that of a driven duplicate gear.

4. The direct-drive system according to claim 3, characterized in that the duplicate gear comprises a first gear and a second gear linked to each other, wherein the first gear is driven and the second gear is in linkage therewith, and the number of teeth of the first gear is greater than that of the second gear.

5. The direct-drive system according to claim 1, characterized in that a first output gear mating with the input end of the gear box is arranged on the motor output shaft, and the gear box comprises, from the input end to the output end, a first duplicate gear, a second duplicate gear and a second output gear successively.

6. The direct-drive system according to claim 5, characterized in that the first duplicate gear comprises a first helical gear and a second helical gear, wherein the first helical gear meshes with the first output gear on the motor output shaft, and the second helical gear meshes with the second duplicate gear.

7. The direct-drive system according to claim 6, characterized in that the diameter of the first helical gear is greater than the diameter of the second helical gear.

8. The direct-drive system according to claim 5, characterized by comprising: the second duplicate gear comprises a third helical gear and a fourth spur gear, wherein the third helical gear meshes with the first duplicate gear, and the fourth spur gear meshes with the second output gear.

9. The direct-drive system according to claim 8, characterized in that the diameter of the third helical gear is greater than the diameter of the fourth spur gear.

10. The direct-drive system according to claim 5, characterized by comprising: the second output gear comprises a fifth spur gear and a power output portion, wherein the fifth spur gear meshes with the second duplicate gear, and the power output portion meshes with the main drive shaft.

11. The direct-drive system according to claim 8, characterized in that the first duplicate gear constitutes a first gear pair with the first output gear on the motor output shaft, and the first duplicate gear constitutes a second gear pair with the third helical gear, wherein the gear slope of the first gear pair is greater than that of the second gear pair.

12. The direct-drive system according to claim 10, characterized by comprising: the main drive shaft is connected to the power output portion of the second output gear through a spline fit.

13. The direct-drive system according to claim 12, characterized by comprising: an outer spline arranged close to a first end of the main drive shaft; and an inner spline mating therewith, which is arranged running through the gear box along the axis of the second output gear.

14. The direct-drive system according to claim 1, characterized in that the gear box is at least partially borne by the main drive shaft.

15. The direct-drive system according to claim 14, characterized in that output end of the gear box is borne by the main drive shaft.

16. The direct-drive system according to claim 15, characterized by comprising: the gear box further comprises a bearing support arranged close to the input end, and the gear box is connected to a bearing seat on a truss of the passenger transportation apparatus by means of the bearing support; and the gear box is partially borne by the truss.

17. The direct-drive system according to claim 16, characterized in that an end of the bearing support and of the bearing seat are respectively provided with a joint bearing and a joint bearing saddle mating with each other.

18. The direct-drive system according to claim 1, characterized in that the motor and a second end of the main drive shaft are arranged at the same side of the gear box.

19. A passenger transportation apparatus, characterized by comprising a direct-drive system as claimed in claim 14, and a truss, wherein the first end and second end of the main drive shaft is connected to the truss in a rotatable manner.

20. The passenger transportation apparatus according to claim 19, characterized by further comprising a bearing base, the first end and second end of the main drive shaft are fixed to the truss via the bearing base, and the main drive shaft rotates about the bearing base.

21. The passenger transportation apparatus according to claim 19, characterized by further comprising a drive sprocket arranged on the main drive shaft, and the output end of the gear box is connected to the main drive shaft at an outer side of the drive sprocket.

22. The passenger transportation apparatus according to claim 19, characterized in that the first end of the main drive shaft is connected to the truss by running through the output end of the gear box.

* * * * *